United States Patent [19]

Stanford et al.

[11] 3,831,709
[45] Aug. 27, 1974

[54] MOBILE AIRCRAFT SHORING AND MAINTENANCE DEVICE

[75] Inventors: Alan G. Stanford, Saint Augustine; George A. Zutell, Jacksonville, both of Fla.

[73] Assignee: Fairchild Industries Inc., Germantown, Md.

[22] Filed: Feb. 16, 1973

[21] Appl. No.: 333,121

[52] U.S. Cl. ............... 180/125, 254/100, 182/178, 244/1 R
[51] Int. Cl. ............... B60p 3/06, B60v 1/00
[58] Field of Search ............ 180/125, 116; 182/127, 182/178, 179; 214/334; 254/93 R, 87, 100; 187/24; 244/1 R

[56] References Cited
UNITED STATES PATENTS

| | | | |
|---|---|---|---|
| 2,147,187 | 2/1939 | Bailey | 254/87 |
| 2,272,349 | 2/1942 | Noser | 182/129 |
| 2,512,150 | 6/1950 | Geren | 254/93 R X |
| 2,882,100 | 4/1959 | Bank | 182/178 X |
| 2,980,270 | 4/1961 | Elliott et al. | 214/334 |
| 3,097,718 | 7/1963 | Jay et al. | 180/125 |
| 3,191,706 | 6/1965 | Petersen | 180/125 |
| 3,256,955 | 6/1966 | Izmirian et al. | 182/179 X |
| 3,564,802 | 2/1971 | Dreyfus | 182/178 |

*Primary Examiner*—Kenneth H. Betts
*Attorney, Agent, or Firm*—Michael W. York

[57] ABSTRACT

A mobile aircraft shoring and maintenance device including a generally triangular shaped aircraft support structure and jacks connected to the support structure which are adapted to engage a portion of the underside of an aircraft to permit the aircraft to be mounted on the aircraft support structure. A forward scaffold structure is connectable to the aircraft support structure and the interior portion of the forward scaffold structure is shaped to generally conform to the exterior of the forward portion of the aircraft. An aft scaffold structure is also connectable to the aircraft support structure and the interior portion of the aft scaffold structure is shaped to generally conform to the exterior of the aft portion of the aircraft. Both the forward and aft scaffold structures have two sections that are locatable adjacent opposite sides of the aircraft and are pivotally connected to the aircraft support structure to permit the two sections to be pivoted outward away from the aircraft. Air cushion supports are located on the underside of the aircraft support structure that provide cushions of air which raise the aircraft support structure slightly and permit the aircraft support structure to be readily moved about.

11 Claims, 9 Drawing Figures

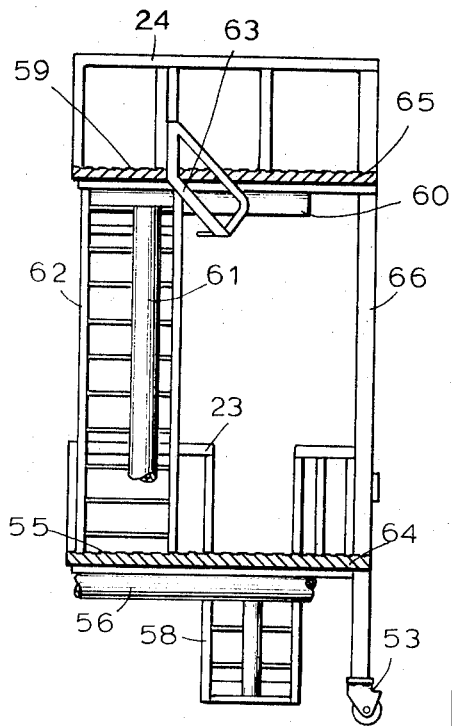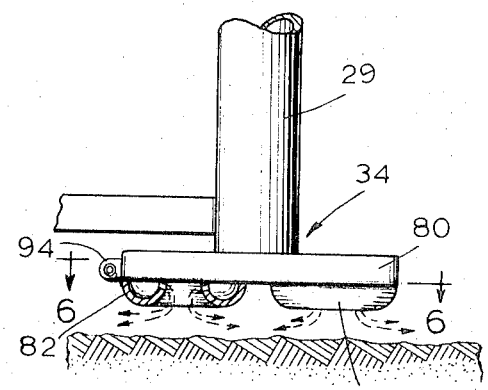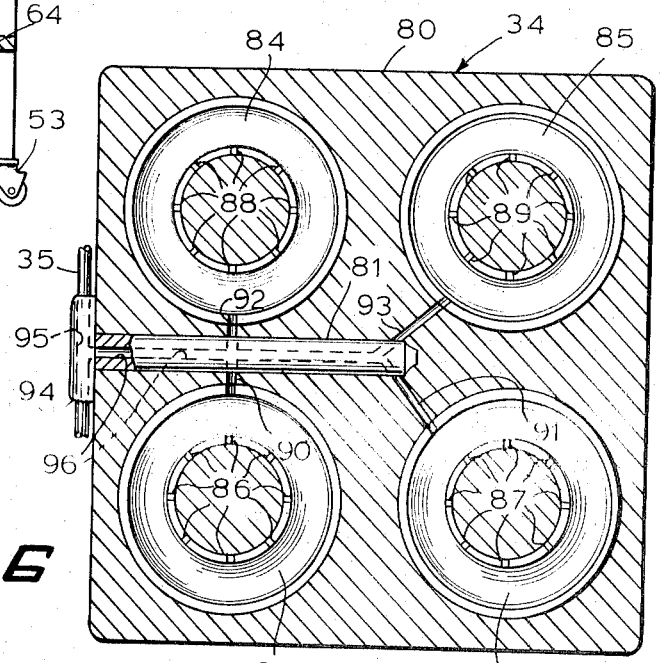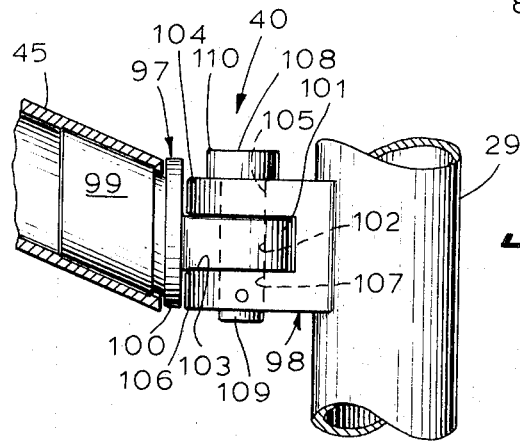

MOBILE AIRCRAFT SHORING AND MAINTENANCE DEVICE

BACKGROUND OF THE INVENTION

Modern aircraft are highly complex and require periodic maintenance and overhaul. This periodic maintenance and overhaul requires the aircraft be removed from service and in view of the high costs of modern aircraft it is important that the aircraft be serviced and overhauled in the shortest possible time. In order to facilitate the maintenance and overhaul of such aircraft and to reduce the time that the aircraft is out of service, it is highly desirable that most of the external areas of the aircraft be readily accessible to the workmen who are to perform the maintenance and overhaul so that various panels that must be removed and various areas and equipment of the aircraft that must be repaired or replaced are readily accessible. It is also important that the aircraft be capable of being readily moved about since the aircraft in most instances will have to be moved from one station or location to another during the time that the maintenance and overhaul is being performed.

Most modern aircraft have rather complex exterior configurations, which include structural panels that cannot be removed unless the aircraft is shored, and the weight of such aircraft makes it difficult to readily move the aircraft during maintenance and overhaul without the use of power driven equipment that can tow or push the aircraft and this makes it difficult to service and maintain the aircraft. Currently, various types of scaffolds and ladders are used to reach the various areas of the aircraft that need servicing or maintenance. However, these scaffolds or ladders need to be individually erected and are not adapted to be readily placed against the various portions of the fuselage of the aircraft. These scaffolds or ladders also do not afford simultaneous access to the various areas of the aircraft that need to be serviced and thus they increase the time and effort that is necessary to properly service and maintain the aircraft. Consequently, there is a definite need for an aircraft maintenance device which will permit the aircraft to be moved about without the need of special power driven equipment and which will provide simultaneous accessibility to most of the aircraft so that workmen can remove the maximum number of access doors for inspection and work in most of the areas of the aircraft. It is also important that any such device provide this accessibility without causing any contortion of the fuselage, wings or the horizontal and vertical stabilizers.

The present invention overcomes the disadvantages associated with prior aircraft maintenance and servicing devices and permits shoring of the aircraft and simultaneous access to large areas of the aircraft and permits the aircraft to be readily moved about without the use of power driven equipment.

BRIEF DESCRIPTION OF THE INVENTION

This invention relates to aircraft shoring or supporting devices and aircraft maintenance devices and more particularly to combined aircraft shoring and maintenance devices.

It is an object of the present invention to provide an aircraft shoring and maintenance device which can readily support an aircraft.

It is an object of the present invention to provide an aircraft shoring and maintenance device which has provisions for easy accessibility to the aircraft.

It is also an object of the present invention to provide an aircraft shoring and maintenance device which provides accessibility to large areas of the aircraft.

It is also an object of the present invention to provide an aircraft shoring and maintenance device which permits the aircraft to be readily moved about.

It is a further object of the present invention to provide an aircraft shoring and maintenance device which permits aircraft to be safely and easily mounted on the aircraft shoring and maintenance device.

The present invention provides a mobile aircraft shoring and maintenance device including an aircraft support structure and mounting means connected to the upper portion of the aircraft support structure for engaging a portion of the underside of an aircraft to permit an aircraft to be mounted on the aircraft support structure. Means are provided which are connected to the lower portion of the aircraft support structure for permitting the aircraft support structure to be moved about. Means are also provided which are connectable to and disconnectable from the aircraft support structure for permitting an individual or individuals to have access to the exterior of the aircraft.

BRIEF DESCRIPTION OF THE DRAWINGS

The invention will be hereinafter more fully described with reference to the accompanying drawings in which:

FIG. 4 is a sectional view of a portion of the mobile aircraft shoring and maintenance device of the present invention;

FIG. 5 is an enlarged view of a portion of the structure illustrated in FIG. 2 taken within the circle 5 thereof;

FIG. 6 is a sectional view of the portion of the mobile aircraft shoring and maintenance device of the present invention taken substantially on the line 6—6 of FIG. 5;

FIG. 7 is an enlarged view of a portion of the structure illustrated in FIG. 2 taken with the circle 7 thereof;

DETAILED DESCRIPTION OF THE PREFERRED EMBODIMENT

Figure 1:
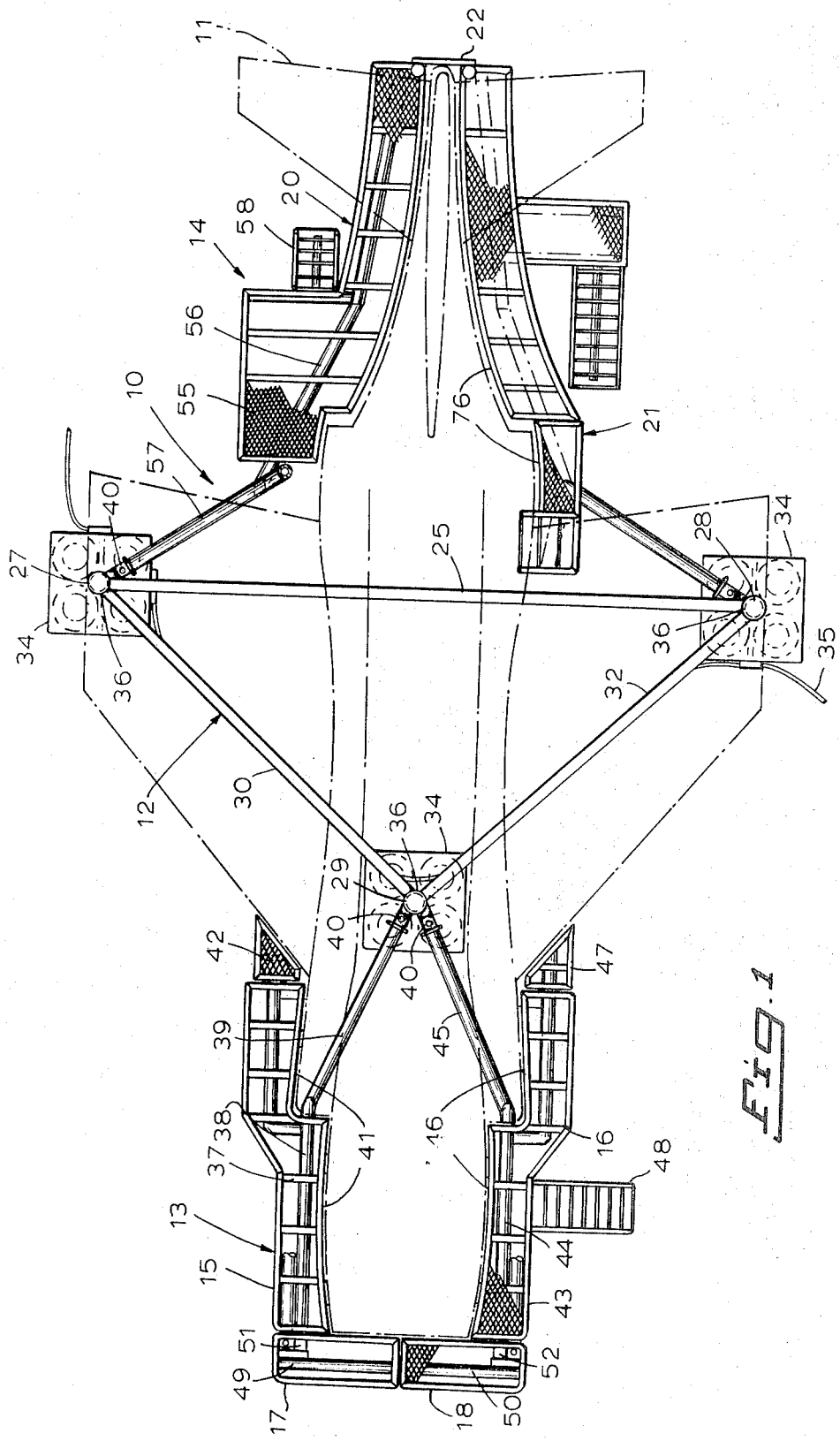
FIG. 1 is a plan view of mobile aircraft shoring and maintenance device of the present invention shown supporting an aircraft with its scaffold structures in position to permit servicing of the aircraft.
Figure 2:
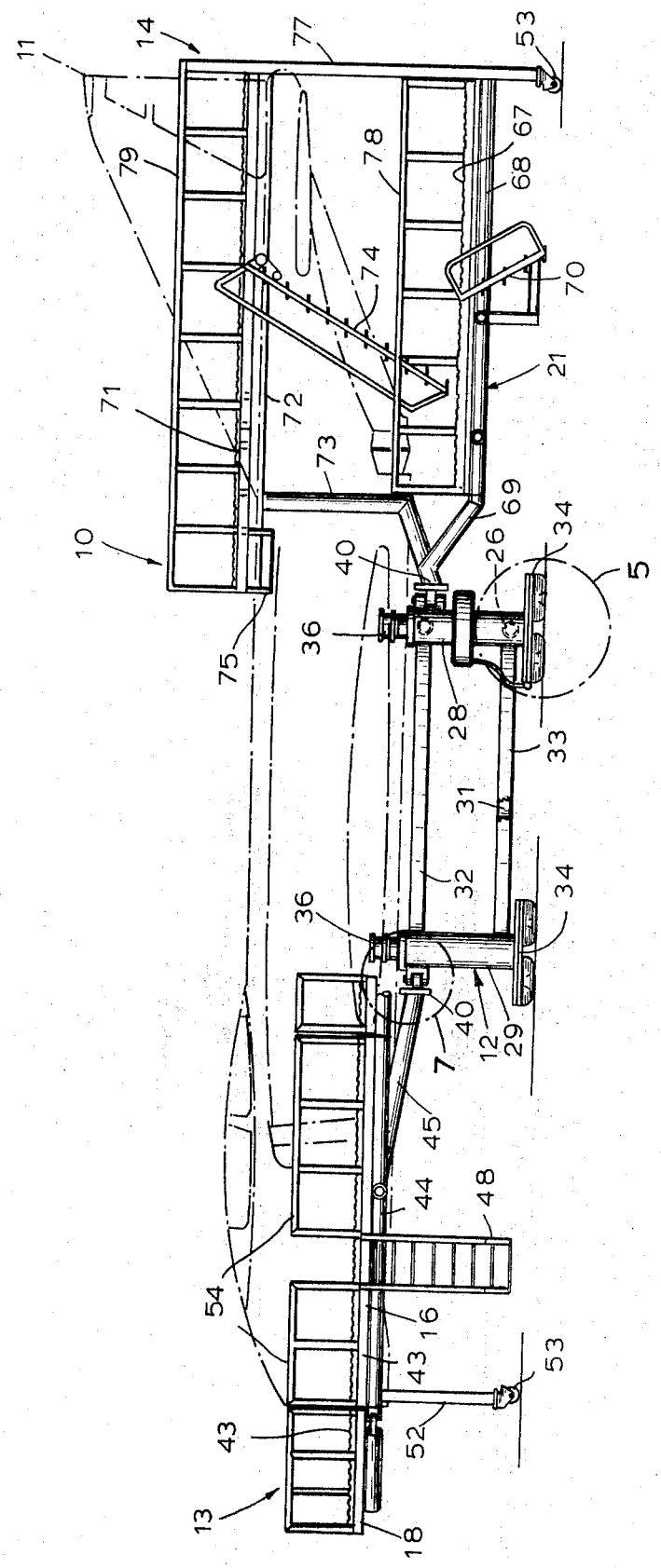
FIG. 2 is a side elevational view of basically the structure illustrated in FIG. 1 with one of its forward scaffold members rotated in a forward direction.
Figure 3:
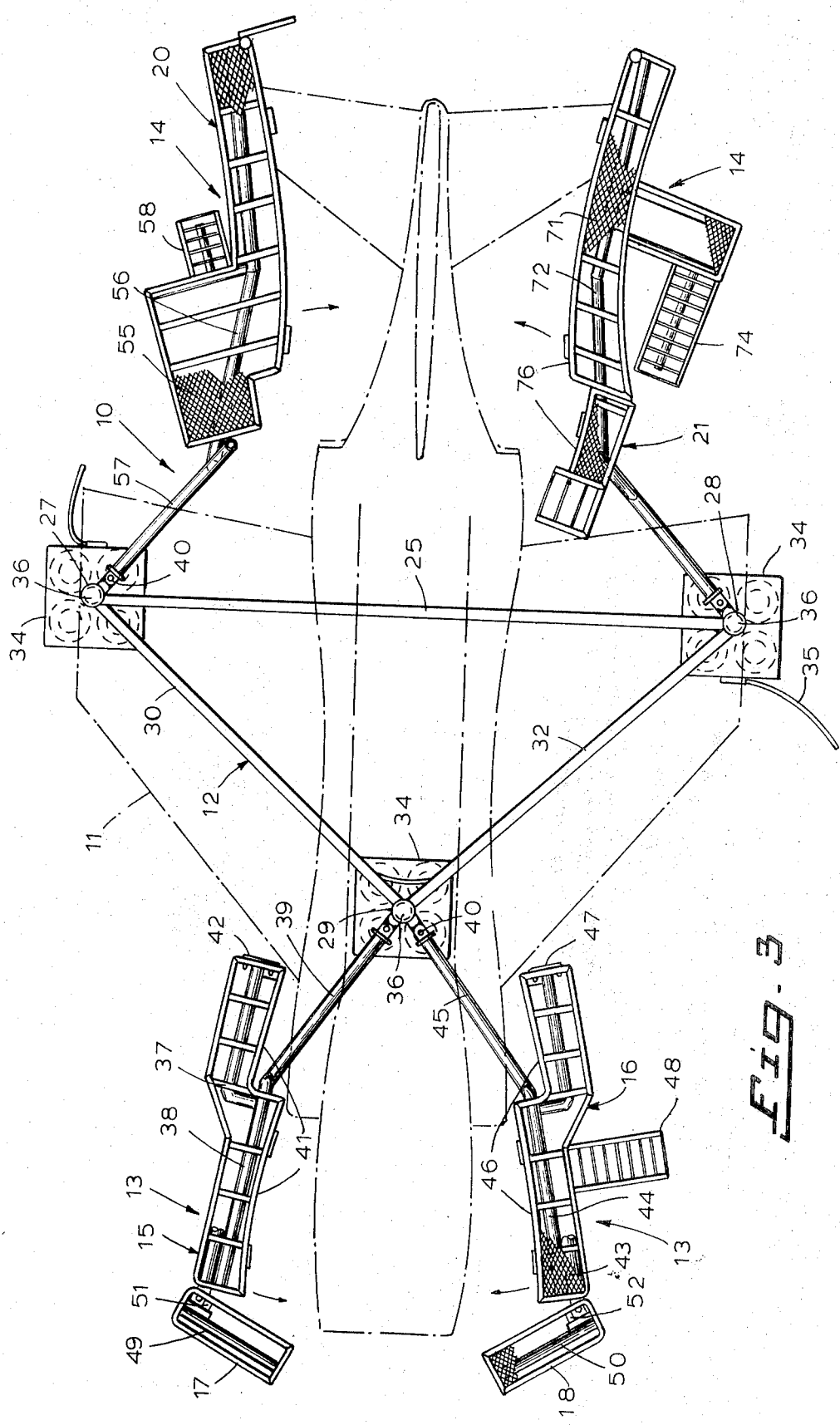
FIG. 3 is a plan view of the mobile aircraft shoring and maintenance device of the present invention shown supporting an aircraft with its scaffold structures pivoted outward away from the aircraft.

Referring first to FIGS. 1 through 3, the mobile aircraft shoring and maintenance device of the invention is illustrated and is generally designated by the number 10. The mobile aircraft shoring and maintenance device is illustrated supporting an aircraft 11 which is outlined in phantom. The mobile aircraft shoring and maintenance device 10 comprises a generally triangular shaped aircraft support structure 12 and means connected to the aircraft support structure for permitting an individual or individuals to have access to the exterior of the aircraft 11 comprising a forward scaffold structure 13 and an aft scaffold structure 14 whose interior portions are shaped to generally conform respectively to the exterior of the forward portion of the aircraft and the aft portion of the aircraft. The forward scaffold structure 13 comprises a first section 15 adapted to be located adjacent to one side of the forward portion of the aircraft 11 and a second section 16 adapted to be located adjacent to the opposite side of the forward portion of the aircraft. Forward platform members 17 and 18 are pivotally connected to the forward ends of the respective first and second sections 15 and 16. In a similar manner, the aft scaffold structure 14 comprises a first section 20 adapted to be located adjacent to one side of the aft portion of the aircraft 11 and a second section 21 adapted to be located adjacent to the opposite side of the aft portion of the aircraft. The aft ends of the sections 20 and 21 may be locked together through the use of a locking bar 22 which is pivotally connected to the aft end of the section 20.

The triangular shaped aircraft support structure 12 comprises upper and lower parallel horizontally extending bars 25 and 26 whose long axes lie substantially perpendicular to the long axis of the aircraft that are rigidly connected at their respective ends to right and left vertical support posts 27 and 28. The triangular shaped aircraft support structure 12 also includes a forward vertical support post 29 located in front of the support posts 27 and 28 and substantially mid way between them. Upper and lower parallel horizontally extending bars 30 and 31 extend from the forward support post 29 to the right support post 27 and have their respective ends rigidly connected to the forward and right support posts. In a similar manner, upper and lower parallel horizontally extending bars 32 and 33 extend from the forward support post 29 to the left support post 28 and are rigidly connected at their respective ends to the forward and left support posts. The open triangular shaped structure that results from the utilization of the horizontal bars 25, 26, 30, 31, 32 and 33 and through vertical support posts 27, 28 and 29 that are spaced so that they each are generally located at the apexes of an isosceles triangle whose sides are formed by the respective horizontal bars 25 and 26, 30 and 31 and 32 and 33, provides a very rigid structure which is also light in weight in comparison to its strength.

Means comprising air cushion support members 34 are provided on the underside of the aircraft support structure 12 for permitting the aircraft support structure to be moved about. An air cushion support member 34 is rigidly secured to the lower end of each support post 27, 28 and 29 and these air cushion support members 34 are supplied with air from an air supply hose 35 that interconnects the cushion support members and is connected to a source of compressed air (not shown). These air cushion support members 34 provide a cushion of air that lifts the support structure 12 and any aircraft that it is supporting off of the ground so that they can be easily moved about without the need for complex equipment.

Mounting means comprising mounting jacks 36 are connected to the upper portion of the aircraft support structure 12 for engaging a portion of the underside of an aircraft 11 to permit the aircraft to be mounted on the aircraft support structure. One mounting jack 36 is connected to the top of the vertical support post 29 and is thus in position to engage a jack point on the underside of the fuselage of the aircraft 11. Another mounting jack 36 is connected to the top of the vertical support post 27 and a mounting jack 36 is also connected to the top of the vertical support post 28. Each of these mounting jacks 36 that are connected to the tops of the support posts 27 and 28 are in position to engage jack points on the underside of the respective wings of the aircraft 11.

The first scaffold section 15 of the forward scaffold structure 13 comprises a work platform 37 and a tubular work platform support member 38 located underneath the work platform that supports the platform. The first scaffold section 15 also includes a tubular support boom 39 that has one end rigidly connected to the support member 38 and extends downwardly and inwardly from the platform support member. The lower end of the tubular support boom 39 has a connector 40 that permits the end of the support boom to be pivotally connected to the support post 29 of the aircraft support structure 12. The work platform 37 is of generally conventional construction and has an outer frame and various struts that are covered by a safety-type expanded metal covering. However, the inner edge 41 of the work platform 37 is shaped to substantially correspond to the exterior configuration of the adjacent right forward portion of the aircraft 11. A generally triangular shaped work platform extension 42 is rotatably connected to the aft edge of the work platform 37 and is adapted to be rotated into a horizontal position as illustrated to provide access to the upper leading edge of the adjacent wing of the aircraft 11.

The second scaffold section 16 of the forward scaffold structure 13 is substantially a mirror image of the first forward scaffold section 15 and comprises a work platform 43 and a tubular work platform support member 44 located underneath the work platform that supports the platform. The second forward scaffold section 16 also includes a tubular support boom 45 that has one end rigidly connected to the platform support member 44 and extends downwardly and inwardly from the platform support member. The lower end of the tubular support boom 45 also has a connector 40 that permits the end of the support boom to be pivotally connected to the support post 29 of the aircraft support structure 12. The work platform 43 is similar to the work platform 37 that has a conventional outer frame and various struts that are covered by a safety-type expanded metal covering. The inner edge 46 of the work platform 43 is shaped to substantially correspond to the exterior configuration of the adjacent left forward portion of the aircraft 11. A generally triangular shaped work platform extension 47 is rotatably connected to the aft edge of the work platform 43 and is adapted to be rotated into a horizontal position as illustrated to provide access to the upper leading edge of the adjacent wing of the aircraft 11. An access ladder 48 is connected to the outer edge of the work platform 43 and extends downward to permit individuals to climb up to the work platform 43.

As previously indicated, the forward scaffold members 17 and 18 are pivotally connected to the forward ends of the first and second sections 15 and 16 and they are constructed from conventional frames and expanded safety-type metal coverings. Tubular support members 49 and 50 are located beneath and connected to the frames and coverings of the respective scaffold members 17 and 18. A vertically mounted leg 51 is rigidly connected at its upper end to the outer end portion of the tubular support member 49 and another vertically mounted leg 52 is rigidly connected at its upper end to the outer end portion of the tubular support member 50. The lower end of the leg 51 and the leg 52 are each provided with a caster 53 to permit the legs to be moved about.

The outer edges of the work platforms 37 and 43, the work platform extensions 42 and 47 and the forward scaffold members 17 and 18 are provided with a conventional railing 54 which for clarity is only illustrated in FIG. 2 and not in FIG. 1 and FIG. 3.

The first scaffold section 20 of the aft scaffold structure 14 comprises a lower work platform 55 and a tubular lower work platform support member 56 located underneath the lower work platform that supports the platform. The first aft scaffold section 20 also includes a tubular support boom 57 that has its lower end rigidly connected to the work platform support member 56 and the tubular support boom 57 extends upwardly and outwardly from the tubular support member. The upper end of the tubular support boom 57 has a connector 40 that permits this end of the support boom to be pivotally connected to the support post 27 of the aircraft support structure 12. An access ladder 58 is connected to the edge of the lower work platform 55 and it extends downwardly to provide access to the lower work platform.

The first scaffold section 20 of the aft scaffold structure 14 also comprises an upper work platform 59, an upper work platform support member 60 located beneath the work platform, and a tubular support boom 61 whose upper end is rigidly connected to the upper work platform support member and whose lower end is rigidly connected to the tubular support boom 57 as illustrated in FIG. 4 where the first aft scaffold section 20 is illustrated. As illustrated in FIG. 4, a ladder 62 is connected to the lower work platform 55 and the upper work platform 59 to provide access to the upper work platform from the lower work platform. A ladder 63 is also connected to the forward edge of the upper work platform 59 and extends downward to provide access from the upper work platform to the top of the fuselage of the aircraft 11. Both the lower work platform 55 and the upper work platform 59 are constructed from conventional frames, struts, and expanded safety-type expanded metal and their respective inner edges 64 and 65 are shaped to substantially correspond to the exterior configuration of the adjacent aft right portion of the aircraft 11. It should be noted that the upper work platform 59, upper work platform support member 60, tubular support boom 61, and ladders 62 and 63 have been omitted from FIGS. 1 through 3 for clarity. A vertically mounted leg 66 is rigidly connected to the aft portions of the inner edges of the lower and upper work platforms 55 and 59 and the leg is provided with a caster 53 to permit it to be moved about. Both the lower and upper work platforms 55 and 59 are provided with conventional respective guard railings 23 and 24.

The second scaffold section 21 of the aft scaffold structure 14 is substantially a mirror image of the first aft scaffold section 20 and as illustrated in FIG. 2, comprises a lower work platform 67 and a tubular lower work platform support member 68 located underneath the lower work platform. The second aft scaffold section 21 also includes a tubular support boom 69 that has its lower end rigidly connected to the work platform support member 68 and the tubular support boom 69 extends upwardly and outwardly from the tubular work platform support member. The upper end of the tubular support boom 69 also has a connector 40 that permits this end of the support boom to be pivotally connected to the support post 28 of the aircraft support structure 12. An access ladder 70 is connected to the edge of the lower work platform 67 and it extends downwardly to provide access to the lower work platform.

The second scaffold section 21 of the aft scaffold structure 14 also comprises an upper work platform 71, an upper work platform support member 72 located beneath the upper work platform, and a tubular support boom 73 whose upper end is rigidly connected to the upper work platform support member and whose lower end is rigidly connected to the tubular support boom 69. A ladder 74 is connected to the lower work platform 67 and the upper work platform 71 to provide access to the upper work platform from the lower work platform. Another ladder 75 is connected to the edge of the upper work platform 71 and extends downward to provide access to the top of the fuselage of the aircraft 11. It should be noted that for clarity the lower work platform 67, tubular work platform support member 68, the boom 69 and the ladder 70 have been omitted from FIGS. 1 and 3. Both the lower and upper work platforms 67 and 71 are similar in construction to the lower and upper work platforms 55 and 59 and their respective inner edges, as indicated for the edge 76 for the upper work platform 71 in FIGS. 1 and 3, substantially correspond to the exterior configuration of the left aft portion of the aircraft 11. A vertically mounted leg 77 is rigidly connected to the aft portions of the inner edges of the lower and upper work platforms 67 and 71 and the leg is provided with a caster 53 to permit it to be moved about. As illustrated in FIG. 2, both the lower and upper work platforms 67 and 71 are provided with respective guard railings 78 and 79.

The details of the construction of the air cushion support members 34 are illustrated in FIGS. 5 and 6. Each air cushion support member 34 comprises a flat rectangular shaped housing 80 that is connected to the underside of the appropriate vertical support posts 27, 28 or 29 and the housing 80 has a cylindrical centrally located air passage 81 that extends from one edge of the housing partially through the housing. Four donut shaped inflatable hollow rubber diaphragms 82, 83, 84 and 85 are mounted in the underportion of the housing 80 to permit the lower portions of the diaphragms to extend below the air cushion support housing when the diaphragms are inflated as best illustrated in FIG. 5. The diaphragms 82, 83, 84 and 85 have respective series of small apertures 86, 87, 88 and 89 that permit air to pass from the hollow interiors of the diaphragms into the holes in the center of the diaphragms as best illustrated in FIG. 6. The interiors of the diaphragms 82, 83, 84 and 85 are connected to the central air passage 81 through respective hollow conduits 90, 91, 92 and 93 that permit air to pass from the central air passage through the respective conduits to the diaphragms. A hose fitting 94 is located in the outer end of the air passage 81. The hose fitting 94 is connected to the air supply hose 35 and it has apertures 95 and 96 for permitting air to pass from the hose through the fitting and into the air passage 81.

FIG. 7 illustrates the details of the connectors 40 that form part of the mobile aircraft shoring and maintenance device 10. Each connector 40 comprises connecting members 97 and 98. The connecting member 97 has an oblique cylindrical portion 99 that is secured inside the end of the appropriate hollow tubular support boom 39, 45, 57 or 69 and a cylindrical flange 100 located at the end of the cylindrical portion that abuts the end of the appropriate tubular support member. A substantially cylindrical projection 101 extends outward from the outer face of the flange 100 and the flange has a centrally located circular aperture 102 that extends completely through the flange.

The connecting member 98 is generally cylindrically shaped and has a portion of its outer wall secured to the appropriate vertical support post 27, 28 or 29 through welding or other suitable techniques. The connecting member 98 has a slot 103 that extends partially through it that is adapted to receive the projection 101 and permit the projection to be slipped in and out of the slot. The upper portion 104 of the connecting member 98 has a circular aperture 105 of the same general diameter as the aperture 102 that extends through it from its upper end to the slot 103 and the lower portion 106 of the connecting member 98 has a circular aperture 107 of the same general diameter as the aperture 105 that extends through it from its lower end to the slot 103. A pin 108 that has a cylindrical shank 109 of suitable diameter can be inserted into the apertures 105, 102 and 107 to rotatably connect the connecting members 97 and 98 and the pin has an enlarged head 110 which holds the pin in place so that the entire connector 40 acts as a hinge and the first and second sections 15 and 16 of the forward scaffold structure 13 and the first and second sections 20 and 21 of the aft scaffold structure 14 can thus be pivoted away from or toward the aircraft 11.

Figure 8:
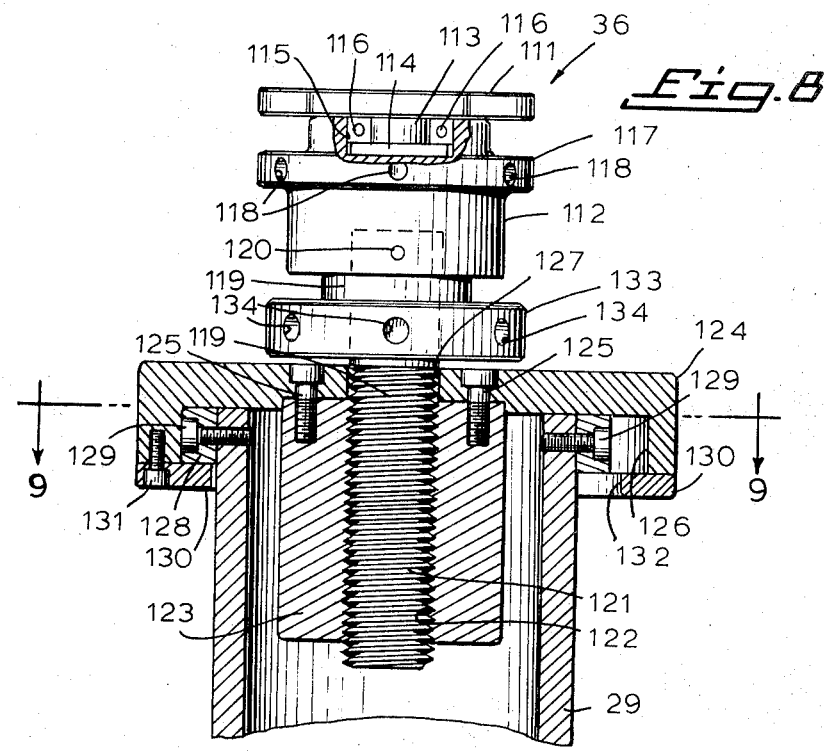
FIG. 8 is an elevational view of a jack forming part of the structure of the mobile aircraft shoring and maintenance device of the present invention.
Figure 9:
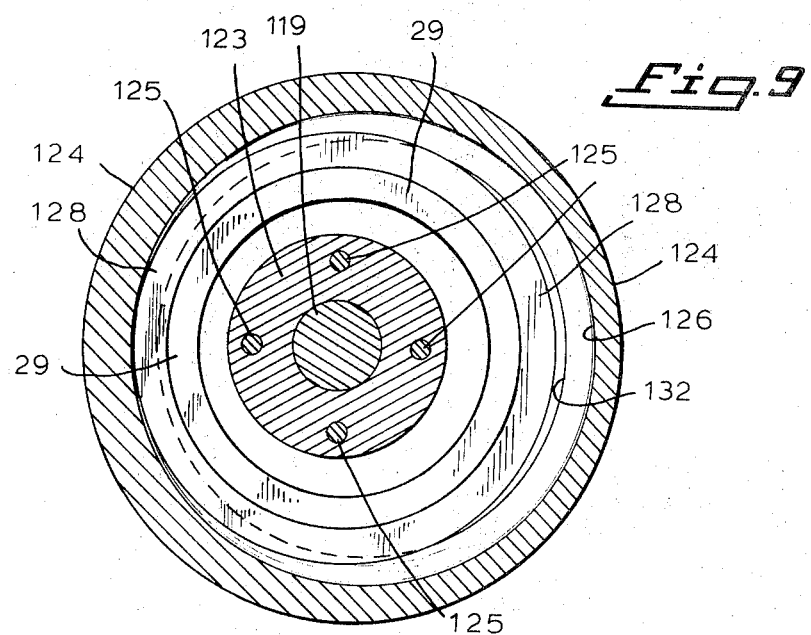
FIG. 9 is a cross sectional view of the structure illustrated in FIG. 8 taken substantially on the line 9—9 thereof.

FIGS. 8 and 9 illustrate the details of the mounting jack 36. Each mounting jack 36 comprises a jack support plate 111 whose upper surface is shaped to match an appropriate jack point (not shown) on the underside of the aircraft 11 and a rotatable jacking member 112. The jack support plate 111 has a cylindrical projection 113 extending from its lower surface and the lower portion of the cylindrical projection has a flange 114. The cylindrical projection 113 fits loosely in a cylindrical cavity 115 in the upper end of the jacking member 112 and the jack support plate 111 is rotatably connected to the jacking member by means of pins 116 that pass horizontally through the jacking member at points at each side of the cylindrical projection 113 just above the flange 114 so that the flange is secured within the cavity 115. The jacking member 112 has a flange 117 that has radially extending holes 118 which are adapted to receive the end of a round bar (not shown) that can be used to rotate the jacking member. The lower end of the jacking member 112 is secured to the upper end of a jack screw 119 by means of a pin 120 that extends through the lower end of the jacking member and the upper end of the jack screw.

The jack screw 119 has a threaded portion 121 whose threads engage corresponding threads on the interior surface of an aperture 122 which extends through a generally cylindrical member 123. The upper portion of the cylindrical member is securely fastened to the under side of a circular support post cap 124 by screws 125. A cylindrical cavity 126 is provided in the underside of the support post cap and the center line of this cavity is offset away from the center line of the support post cap. The support post cap also has an aperture 127 which permits the jack screw 119 to pass through the post cap. A collar 128 fits around the outside of the upper end of the support post 27, 28 or 29 and the collar is securely fastened to the support post by means of suitable screws 129. A circular locking plate 130 is secured to the lower surface of the support post cap 124 by screws 131 (only one of which is shown) and the locking plate has a circular opening 132 which is slightly less in diameter than the outer diameter of the collar 128 whose center is offset away from the center of the locking plate. A locking ring 133 is rotatably mounted on the threaded portion 121 of the jack screw 119 just above the upper surface of the support post cap 124 and the locking ring has radial holes 134 which are adapted to receive the end of a round bar that can be used to turn the locking ring and lock the jack screw to the support post cap.

In order to use the mounting jack 36, the rotatably jacking member 112 is rotated in a suitable direction through the use of a round bar and this causes the jack screw 119 to rotate and move upward and out of the cylindrical member 123. As a result of this rotation, the jack screw 119, the jacking member 112 and the jack support plate 111 all move upward. When the support plate 111 has almost reached its desired level, the support plate, the jacking member 112, the jack screw 119, the locking ring 133, the cylindrical member 123, the post cap 124, and the locking plate 130 can all be moved laterally in view of the unique offset apertures 126 and 132 so that the jack support plate can be moved laterally to permit it to be located under variously spaced jack points on the underside of different aircraft. When the jack support plate 111 is suitably located laterally, it can be rotated into position to match the jack point on the underside of the aircraft 11 and the jacking member can be rotated to cause the jack support plate to engage the jack point. The locking ring 133 can then be tightened to secure the jack screw 119 to the support post cap 124.

In order to use the mobile aircraft shoring and maintenance device 10, the aircraft support structure 12 without the forward and aft scaffold structures 13 and 14 is suitably located and an aircraft 11 is hoisted using conventional techniques onto the aircraft support structure after the jacks 36 have been appropriately adjusted as previously described so that their jack support plates 111 are in position to match the jack points on the aircraft. The forward and aft scaffold structures 13 and 14 are then brought into position around the respective forward and aft portions of the aircraft 11 as illustrated in FIG. 3.

Compressed air can then be supplied to the air cushion support members 34 from the air supply hose assembly 35 so that the air cushion support members provide a cushion of air that raises the aircraft support structure 12, the aircraft 11 that is mounted on the support structure, and the forward and aft scaffold structures 13 and 14 slightly off of the ground. The entire mobile aircraft shoring and maintenance device 10 and the aircraft 11 can then be moved by hand without the need for power driven equipment to a suitable place for performing work on the aircraft. It will of course be appreciated that the aircraft can be moved only on the support structure 12 without the forward and aft scaffold structures 13 and 14 if it is desired. In this event, the forward and aft scaffold structures 13 and 14 will be connected to the support structure 12, after the aircraft support structure 12 and the aircraft have been moved and then the sections of the forward and aft scaffold structures are pivoted inward toward the aircraft.

After the entire mobile aircraft shoring and maintenance device 10 and the aircraft 11 are in the proper location, workmen or other individuals or an individual person can gain access to the forward portion of the aircraft 11 for inspection or maintenance purposes and the like by climbing the ladder 48 which is connected to the work platform 43 of the second forward scaffold section 16 of the forward scaffold structure 13. From the platform 43, the workmen or individuals can easily pass to the adjacent connected work platforms 17, 18, 37, 42 and 47. In a similar manner, workmen or other individuals or an individual person can gain access to the aft portion of the aircraft 11 for inspection or maintenance purposes or the like by climbing either the ladder 58 which is connected to the work platform 55 or by climbing the ladder 70 which is connected to the work platform 67. Access can then be gained to the appropriate upper work platforms 59 and 71 from the respective lower work platforms 55 and 67 through the use of the respective ladders 62 and 74. The workmen or other individual person can gain access to the top of the fuselage of the aircraft from either the upper platform 59 or 71 through the use of the respective ladder 63 or 75.

After the inspection or maintenance on the aircraft 11 has been completed, compressed air can then be supplied to the air cushion support members 34 from the air supply hose assembly 35 to provide cushions of air that raise the aircraft support structure 12 and the aircraft 11 slightly off of the ground. The entire support structure 12 and scaffolds and the aircraft 11 can then be easily moved to another location for storage or other maintenance or inspection.

Although the invention has been described with reference to a certain preferred embodiment, it should be understood that many variations and modifications may be made without departing from the spirit and scope of the invention as defined in the appended claims.

What is claimed is:

1. A mobile aircraft shoring and maintenance device comprising an aircraft support structure, mounting means connected to the upper portion of said aircraft support structure for engaging a portion of the underside of said aircraft and for mounting said aircraft on said support structure, means connected to the lower portion of said aircraft support structure for permitting said aircraft support structure to be moved about, a forward scaffold structure adapted to be located adjacent to the forward portion of the aircraft, and an aft scaffold structure adapted to be located adjacent to the aft portion of the aircraft, said forward and aft scaffold structures being connectable to and disconnectable from said support structure.

2. The mobile aircraft shoring and maintenance device of claim 1 wherein said aircraft support structure is triangular shaped.

3. The mobile aircraft shoring and maintenance device of claim 2 wherein said mounting means are located near the corners of said triangular shaped aircraft support structure.

4. The mobile aircraft shoring and maintenance device of claim 1 wherein said mounting means comprise jacks.

5. The mobile aircraft shoring and maintenance device of claim 4 wherein said jacks are laterally adjustable to compensate for variations on the location of jack mounting points in various aircraft.

6. The mobile aircraft shoring and maintenance device of claim 1 wherein said means for permitting said aircraft support structure to be moved about includes means for supporting said aircraft support structure on a cushion of air.

7. The mobile aircraft shoring and maintenance device of claim 1 wherein the interior portion of said forward scaffold structure is shaped to generally conform to the exterior of the forward portion of the aircraft and wherein the interior portion of said aft scaffold structure is shaped to generally conform to the exterior of the aft portion of the aircraft.

8. The mobile aircraft shoring and maintenance device of claim 7 wherein said forward scaffold structure comprises a first scaffold section adapted to be located on one side of the aircraft, a second scaffold section adapted to be located on the opposite side of the aircraft and wherein said aft scaffold structure comprises a first scaffold section adapted to be located on one side of the aircraft and a second scaffold section adapted to be located on the opposite side of the aircraft.

9. The mobile aircraft shoring and maintenance device of claim 8 wherein said first and second scaffold sections of said forward scaffold structure and said first and second scaffold sections of said aft scaffold structure are pivotally connectable to said aircraft support structure to permit the first and second scaffold sections of said forward scaffold structure and said aft scaffold structure to be pivoted away from the aircraft.

10. The mobile aircraft shoring and maintenance device of claim 9 wherein said aft scaffold structure includes an upper first scaffold section located above the first scaffold section of said aft scaffold structure and an upper second scaffold section located above the second scaffold section of said aft scaffold structure.

11. The mobil aircraft shoring and maintenance device of claim 1 wherein said forward and aft scaffold structures are pivotally connectable to said aircraft support structure.

* * * * *